United States Patent
Abbo et al.

(10) Patent No.: US 11,388,805 B2
(45) Date of Patent: Jul. 12, 2022

(54) METHOD FOR INTEGRATION OF PLUG LOAD CONTROLLERS IN A LIGHTING SYSTEM

(71) Applicant: SIGNIFY HOLDING B.V., Eindhoven (NL)

(72) Inventors: Anteneh Alemu Abbo, Eindhoven (NL); Octavio Alejandro Santana Arnaiz, Eindhoven (NL); Lambertus Adrianus Marinus De Jong, Son (NL); Bozena Erdmann, Aachen (DE); Ganapathy Subramanian Natarajan, S-Hertogenbosch (NL); Peter Fitski, Helmond (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/272,294

(22) PCT Filed: Aug. 23, 2019

(86) PCT No.: PCT/EP2019/072543
§ 371 (c)(1),
(2) Date: Feb. 27, 2021

(87) PCT Pub. No.: WO2020/043605
PCT Pub. Date: Mar. 5, 2020

(65) Prior Publication Data
US 2021/0400787 A1 Dec. 23, 2021

(30) Foreign Application Priority Data
Aug. 28, 2018 (EP) ..................................... 18191159

(51) Int. Cl.
*H05B 47/16* (2020.01)
*H05B 47/19* (2020.01)
(Continued)

(52) U.S. Cl.
CPC ........... *H05B 47/16* (2020.01); *H05B 47/155* (2020.01); *H05B 47/165* (2020.01); *H05B 47/19* (2020.01)

(58) Field of Classification Search
CPC ...... H05B 47/16; H05B 47/19; H05B 47/155; H05B 47/165
See application file for complete search history.

(56) References Cited

U.S. PATENT DOCUMENTS 9,820,361 B1 11/2017 Turvy, Jr. et al.
9,986,623 B1 5/2018 Miu et al.
(Continued)

FOREIGN PATENT DOCUMENTS

JP 08241274 A 9/1996
JP 2015528992 A 10/2015
(Continued)

*Primary Examiner* — Alexander H Taningco
*Assistant Examiner* — Pedro C Fernandez

(57) ABSTRACT

A distributed control system including a plurality of controllers, each controller of the plurality of controllers being in communication with the remaining controllers of the plurality of controllers, each controller being configured to control at least one device, each controller being further configured to: initiate a first timer, in response to a received signal, the first timer having a length that is unique with respect to the first timer lengths of the remaining controllers of the plurality of controllers; send a first notification signal, upon the expiration of the first timer, to the remaining controllers notifying the remaining controllers of an intent to send a command signal; send the command signal to the at least one device, wherein the controller is configured to cancel sending the notification signal and the command signal if the notification signal is first received from one of the remaining controllers of the plurality of controllers prior to the expiration of the first timer.

15 Claims, 12 Drawing Sheets

(51) Int. Cl.
   *H05B 47/155*   (2020.01)
   *H05B 47/165*   (2020.01)

(56) References Cited

U.S. PATENT DOCUMENTS

| | | | |
|---|---|---|---|
| 2008/0180270 | A1* | 7/2008 | Veskovic .............. H05B 41/38 |
| | | | 340/4.32 |
| 2010/0324962 | A1 | 12/2010 | Nesler et al. |
| 2012/0007511 | A1 | 1/2012 | Choong et al. |
| 2012/0299485 | A1 | 11/2012 | Mohan et al. |
| 2014/0172184 | A1 | 6/2014 | Schmidt et al. |
| 2016/0011636 | A1 | 1/2016 | Zhang et al. |
| 2017/0094134 | A1 | 3/2017 | Lunn et al. |

FOREIGN PATENT DOCUMENTS

| | | | |
|---|---|---|---|
| WO | 2013101766 | A1 | 7/2013 |
| WO | 2017093559 | A1 | 6/2017 |
| WO | 2017142015 | A1 | 8/2017 |

\* cited by examiner

METHOD FOR INTEGRATION OF PLUG LOAD CONTROLLERS IN A LIGHTING SYSTEM

CROSS-REFERENCE TO PRIOR APPLICATIONS

This application is the U.S. National Phase application under 35 U.S.C. § 371 of International Application No. PCT/EP2019/072543, filed on Aug. 23, 2019, which claims the benefit of European Patent Application No. 18191159.5, filed on Aug. 28, 2018. These applications are hereby incorporated by reference herein.

FIELD OF INVENTION

The present invention is directed to distributed control systems. More particularly, various inventing methods and apparatus disclosed herein relate to a distributed control system including multiple distributed controllers configured to control at least one slave device in a coordinated manner.

BACKGROUND

To further improve energy efficiency of buildings, smart control of plugged devices is becoming an important consideration in building regulations such as Title 24 2013 and ASHRAE 90.1 2010. Plug load control improves energy-saving by automatically discontinuing power to designated plug loads when a space has been vacated. Products not in use or on standby account for as much as 25 percent of total electrical consumption in commercial buildings. Examples include task lighting, computers, monitors, cell phone chargers, A/V equipment, and other electronic devices that can be switched OFF when the occupant is not around or at appropriate times (e.g., at night) without causing harmful consequences.

Since plug load control is mostly associated with the presence of individuals, it is in principle possible to combine with lighting control systems that are also based on occupancy information or schedules. Consequently, many lighting companies have started providing plug load control in addition to smart lighting control.

For new buildings or those with full refurbishment, appropriate network-connected power controllers can be installed and power cables drawn to the desired plug outlets to make them controllable. As an example, the Philips Dynalite system provides load controllers that are controlled via a DyNet protocol to operate devices such as curtains, blinds, etc., in addition to lighting fixtures. Other approaches include direct sensor control of plug load receptacles using wired or wireless interfaces.

Many systems used to control plug load systems have inherent problems. For example, a single central controller used to control the plug load system could become a single point of failure either due to malfunction, erroneous disconnection by the user or overloading from messages that it needs to handle, especially if the central controller manages both lighting and plug load control tasks for a larger scale network (e.g. a floor or a wing).

Furthermore, there is a special requirement for the gateway to actively listen to sensor data from a designated area and accordingly generate plug load control commands in real time—this may lead to increase in network traffic as sensors in each luminaire may need to report to the central controller—in addition to reporting to the local group of lighting.

In an extreme case, a dedicated central controller with occupancy sensors separate from those integrated in the luminaires might suffice for meeting the building codes; however, this is not optimal since it increases the overall cost due to duplication of occupancy sensors and installation process. Furthermore, having a dedicated gateway is often unacceptable for other reasons, e.g. installation cost of placing and powering the gateway, finding a logical location for the gateway in an otherwise closed ceiling, etc.

Accordingly, there is a need in the art for distributed control system with low network overhead for controlling plug load control devices or other similar slave devices.

SUMMARY

The present disclosure describes various embodiments of a distributed control system including multiple distributed controllers configured to control at least one slave device in a coordinated way, thus creating a many-to-one or many-to-many relationship between controllers and slave devices in a low-network-overhead configuration. In view of the foregoing, various embodiments and implementations are directed to a control system including multiple distributed controllers that each are configured to notify the remaining distributed controllers of an intent to control the at least one slave device. Each controller thus has an awareness of the future state of the slave device and actions to be taken by the remaining distributed controllers.

Generally, in one aspect, distributed control system, includes: a plurality of controllers, each controller of the plurality of controllers being in communication with the remaining controllers of the plurality of controllers, each controller being configured to control at least one device, each controller being further configured to: initiate a first timer, in response to a received signal, the first timer having a length that is unique with respect to the first timer lengths of the remaining controllers of the plurality of controllers; send a first notification signal, upon the expiration of the first timer, to the remaining controllers notifying the remaining controllers of an intent to send a command signal; and send the command signal to the at least one device, wherein the controller is configured to cancel sending the first notification signal and the command signal if the first notification signal is first received from one of the remaining controllers of the plurality of controllers prior to the expiration of the first timer.

According to an embodiment, each controller is further configured to: initiate a second timer, the second timer having an expiration after the expiration of the first timer, the second timer having a length that is unique with respect to the second timer lengths of the remaining controllers of the plurality of controllers; send a second notification signal, upon the expiration of the second timer, to the remaining controllers notifying the remaining controllers of an intent to send a second command signal; and send the second command signal to the at least one device, wherein the controller is configured to cancel sending the second notification signal and the second command signal if the second notification signal is received from one of the remaining controllers of the plurality of controllers prior to the expiration of the second timer.

According to an embodiment, each controller is further configured to:
initiate a third timer, wherein the length of the third timer is the same across all remaining controllers and is greater than the length of the first timer; and initiate the second timer in response to the expiration of the third timer.

According to an embodiment, the at least one device is a plug load control device.

According to an embodiment, the first command signal is an ON command configured to cause the plug load control device to cause power to be delivered to a socket.

According to an embodiment, the received signal is a sensor signal.

According to an embodiment, the received signal is only received at a subset of the plurality of controllers, wherein the notification signal notifies at least one controller of the remaining controllers of detected motion.

According to an embodiment, the sensor signal originates at a sensor coupled to at least one controller of the plurality of controllers.

According to an embodiment, the controller coupled to the sensor is configured to notify the remaining distributed controllers of the sensor signal.

According to an embodiment, the received signal is received from another controller of the plurality of controllers.

According to an embodiment, the second command signal is an OFF command.

According to an embodiment, the length of the first timer is randomly set and has a maximum possible value.

According to an embodiment, each controller includes a respective wireless module through which each controller communicates with the remaining controllers of the plurality of controllers.

In another aspect, a distributed control system includes a plurality of controllers, each controller of the plurality of controllers being in communication with the remaining controllers of the plurality of controllers, each controller being configured to control at least one device, each controller being further configured to:

send a command signal, in response to a received signal, to the remaining controllers and to the at least one device, wherein the remaining controllers and the at least one device, in response to the command signal recall a prestored setting.

According to an embodiment, each controller is further configured to:

initiate a timer, the second timer having a length that is unique with respect to the second timer lengths of the remaining controllers of the plurality of controllers; send a second command signal to the remaining controllers and to the at least one device, wherein the remaining controllers and the at least one device, in response to the second command signal recall a second prestored setting.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

In one network implementation, one or more devices connected to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

The present disclosure describes various embodiments of a distributed control system including multiple distributed controllers configured to control at least one slave device in a coordinated way, thus creating a many-to-one or many-to-many relationship between controllers and slave devices.

In view of the foregoing, various embodiments and implementations are directed to a control system including multiple distributed controllers that each are configured to notify the remaining distributed controllers of an intent to control the (at least one) slave device. Each controller thus has an awareness of the future state of the slave device and actions to be taken by the remaining distributed controllers.

Figure 1:
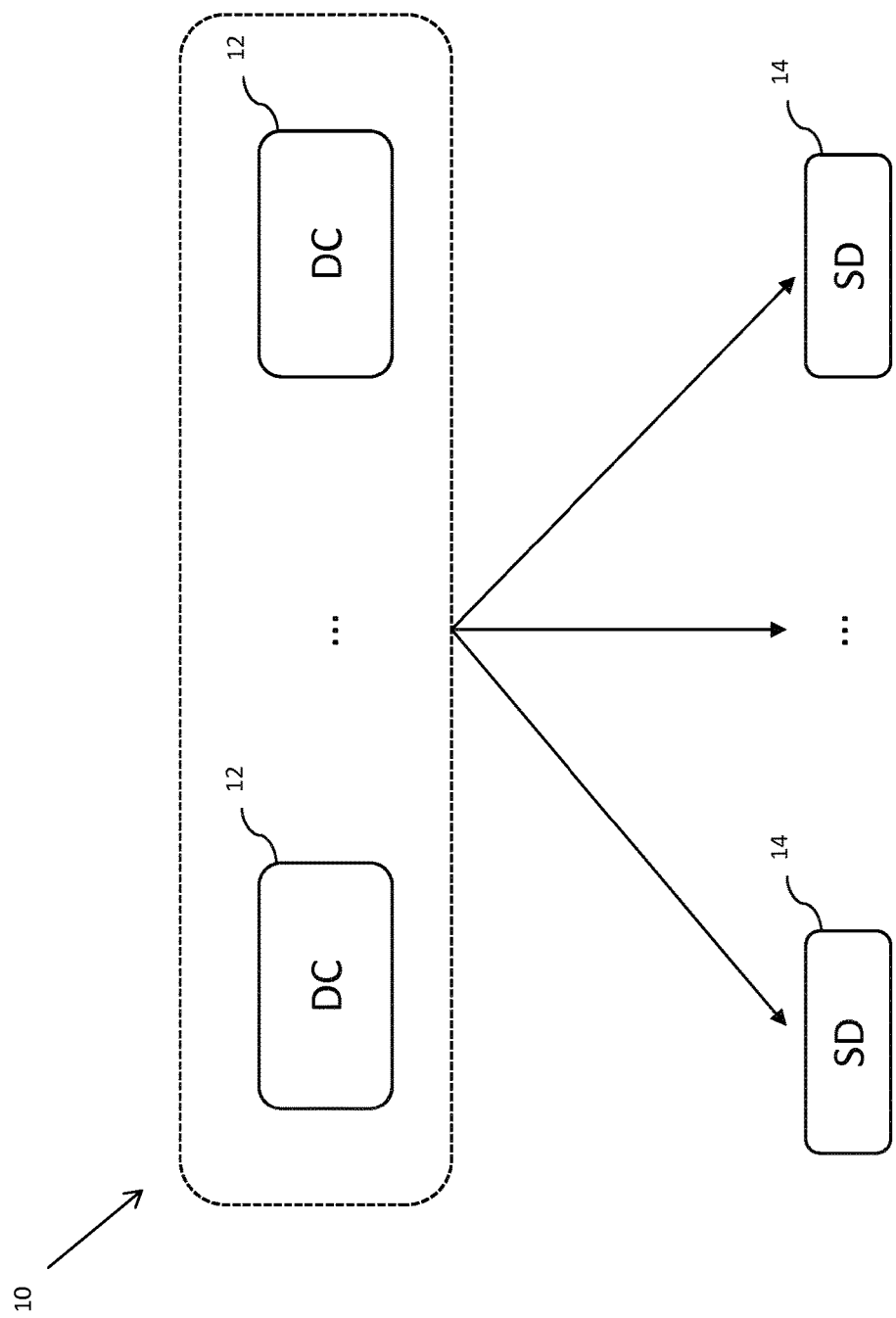
FIG. 1 is a schematic representation of a distributed control system in accordance with an embodiment.

Referring to FIG. 1, in one embodiment, a schematic of a distributed control system 10 is provided. As shown, the distributed control system includes multiple distributed controllers 12 (denoted as DC) and multiple slave devices 14 (denoted as SD). In an embodiment, each controller 12 is responsible for controlling each slave device 14. In order to keep network overhead low, the distributed controllers 12 control the slave devices 14 in a coordinated way such that only one controller 12 sends a control signal to a slave device 14.

At a high-level, according to one embodiment, each distributed controller may activate a timer in response to the input (e.g., a sensor input or user input). The length of the timer is unique for each distributed controller with respect to the other distributed controllers. The distributed controller 12 having the shortest timer will notify, at the expiration of the timer, the remaining distributed controllers 12 of its intent to control the slave device 14. The remaining distributed controllers 12, in response to the notification, will not attempt to control the slave device 14. The distributed controller 12 that sent the notification will then control the slave device 14 without interference or unnecessary control signals from the remaining distributed controllers, thus keeping network overhead low. This sequence may be used to activate, deactivate, or otherwise control the slave device 14. This sequence, and other related embodiments, will be discussed in depth below in conjunction with FIGS. 2A-8B.

Figure 2A:
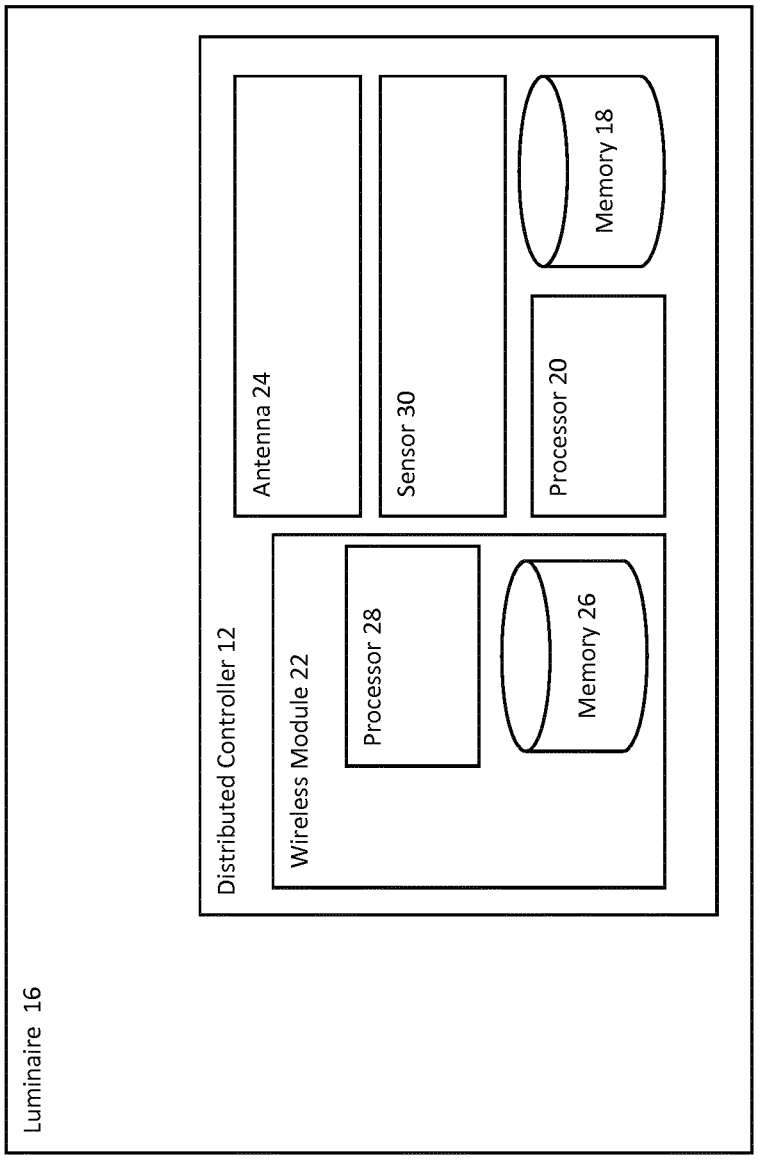
FIG. 2A is a schematic representation of a distributed controller according to an embodiment.
Figure 2B:
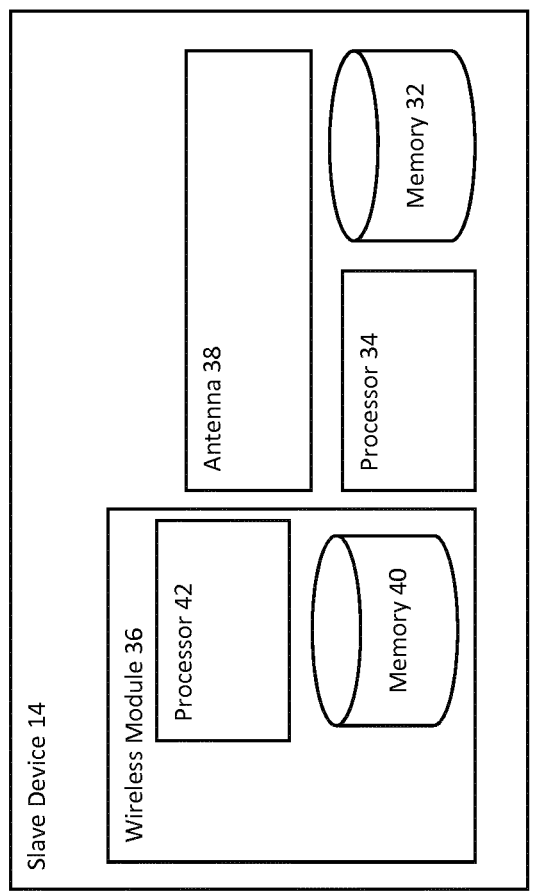
FIG. 2B is a schematic representation of a slave device according to an embodiment.
Figure 3:
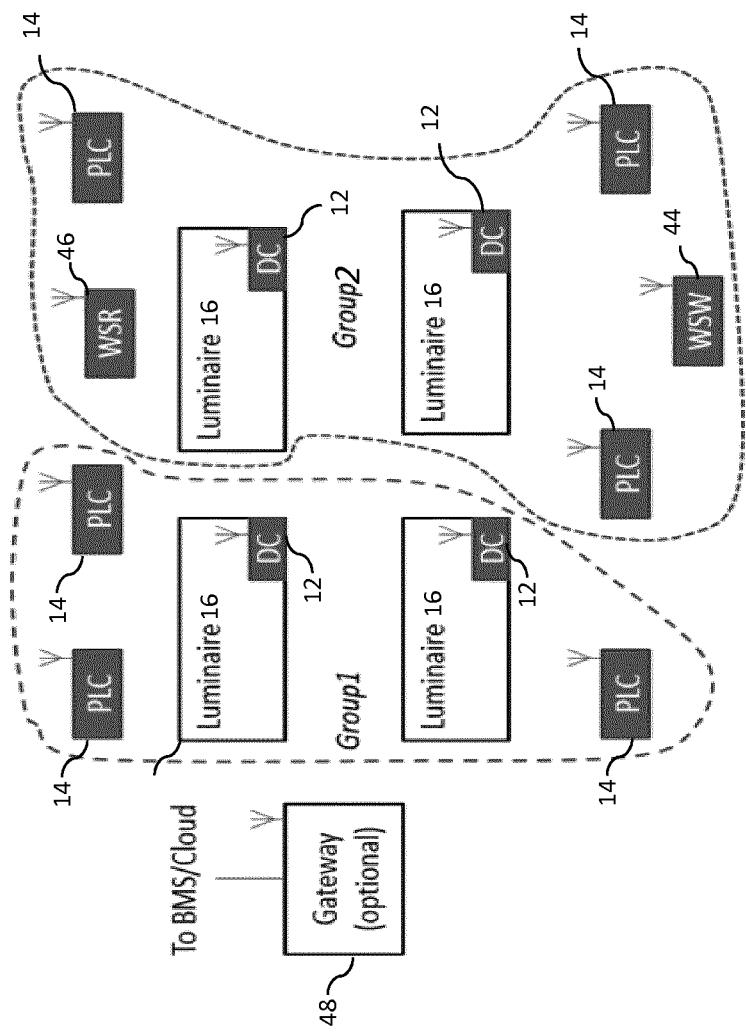
FIG. 3 is a schematic representation of a distributed control system in accordance with an embodiment.

Turning to FIG. 2A, there is shown a schematic representation of a distributed controller according to an embodiment. Each distributed controller may be, for example, included in a respective luminaire 16 as part of an extension of an existing (or new) distributed lighting control system. Indeed, the system described herein may be used with lighting systems extended with non-lighting controllers in multiple zones, groups, e.g. plug loads, HVAC devices, blind controllers, etc. Alternately, distributed controllers 12 may be an extension of a different control system or implemented as a stand-alone system. In yet another alternative, the distributed controller functionality may be available in devices which are part of the network, but themselves not controlled by the input (e.g. energy meter in a building automation system including lighting control and HVAC control). Distributed controllers 12 may each include a memory 18 and processor 20, respectively configured to store and execute the steps described in connection with FIGS. 4-8B.

Figure 4:
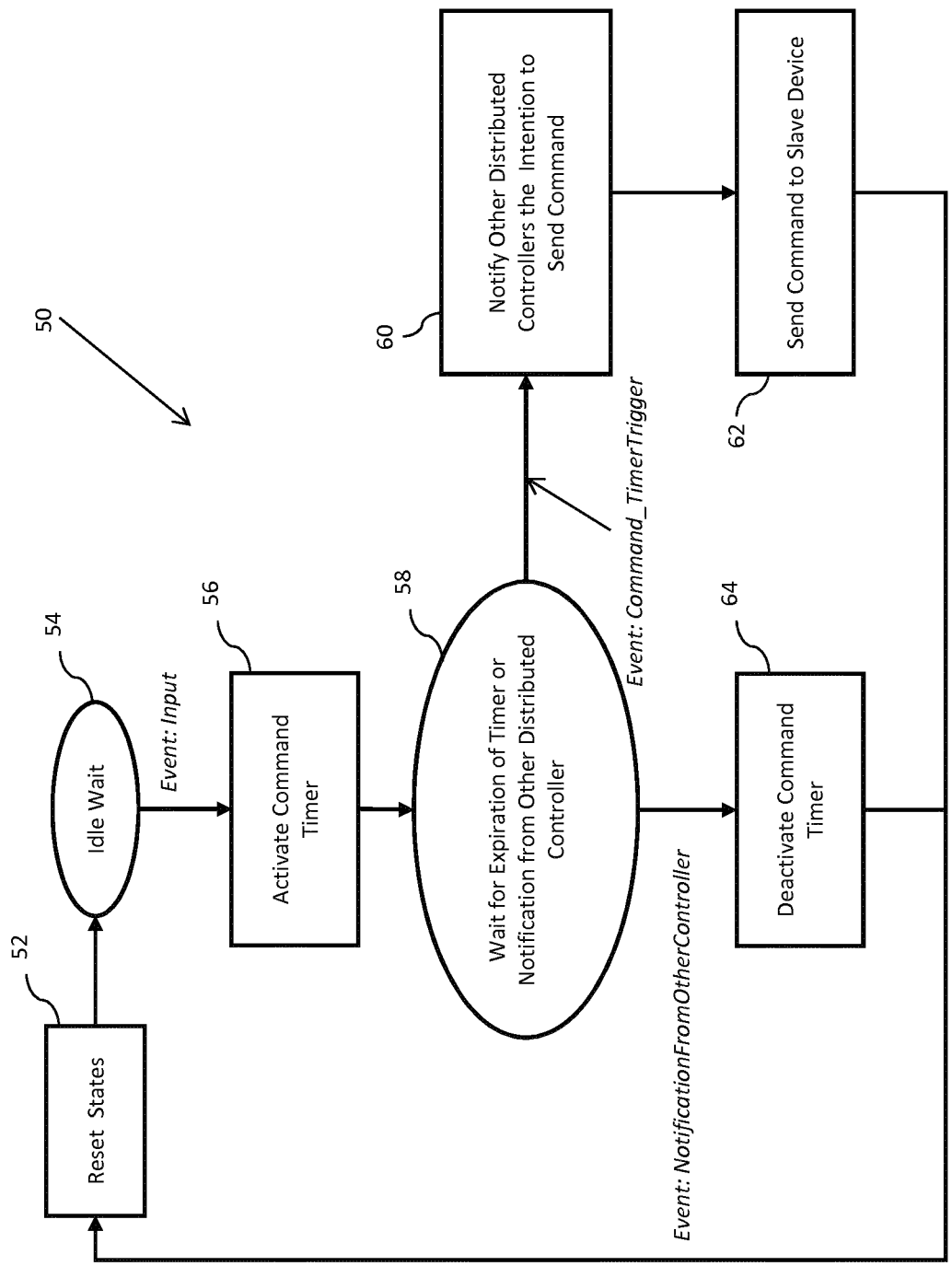
FIG. 4 is a flowchart of a method implemented by a distributed controller in accordance with an embodiment.

Distributed controllers may further include wireless module 22, which facilitates wireless communication (via antenna 24) between the distributed controllers 12, and/or between the distributed controllers 12 and the slave devices 14 and/or between the distributed controllers 12 and any connected device, such as a switch 44, stand-alone sensor 46 or gateway 48 (collectively shown in FIG. 4). The wireless communication can be ZigBee, Bluetooth, Thread, WiFi, LiFi or any other Visual Light Communication protocol, or any other wireless protocol. In an embodiment, a combination of network types may be used (e.g., one protocol type for communications between distributed controllers 12 and another protocol for communicating with slave devices 14, or one protocol type for communication between the sensor, integrated 30 or stand-alone 46, or switch 44, and the distributed controllers 12, and another protocol for communicating between the distributed controllers 12 and with the slave devices 14). In yet another embodiment, communication between different device groups/types may not only use different protocol, but also different interfaces. Although wireless module 22 is shown as an integral component of the distributed controller 12, the wireless module 22 may be a separate component. For example, the wireless module 22 may be separate from, but in wired communication with, distributed controller 12. Wireless module 22 may comprise a memory 26 and a processor 28 (which may be memory 18 and processor 20), which may be programmed or configured to facilitate and/or implement the functionality of the wireless module 22 as described or otherwise envisioned herein.

In yet another embodiment, the distributed controllers 12 are wired together and/or wired to slave devices 14 and/or wired to any peripheral devices, such as switches or gateways, instead of communicating wirelessly.

Distributed controllers 12 may each further include a sensor 30 such as an occupancy sensor to determine the presence of a user within a predefined area (e.g., a room). The occupancy sensor can use at least one of the following sensing modalities, or a combination thereof: passive infrared, ultrasound, microwave, radar, cameras of any resolutions and spectra, including thermal pictures and disturbance of electromagnetic signals. The sensor 30 may be integrated into at least one of distributed controllers 12 or may be a stand-alone sensor 46 (as shown in FIG. 4) in communication with at least one of the distributed controllers 12.

Slave devices 14 may be, for example, lighting devices or plug load control devices, however it should be understood that other types of slave devices may be used. Similar to distributed controllers 12, slave devices 14 may include each include a memory 32 and processor 34, respectively configured to store and execute the steps described in connection with FIGS. 4-8B.

Slave devices 14 may each further include wireless module 36, which facilitates wireless communication (via antenna 38) between the distributed controllers 12 and the slave devices 14. The wireless communication can be ZigBee, Bluetooth, Thread, WiFi, LiFi or any other Visual Light Communication protocol, or any other wireless protocol. In an embodiment, a combination of network types may be used (e.g., one protocol type for communications between distributed controllers 12 and another protocol for communicating with slave devices 14). Although wireless module 36 is shown as an integral component of the slave device 14, the wireless module 36 may be a separate component. For example, the wireless module 36 may be separate from, but in wired communication with, slave device 14. Wireless module 22 may comprise a memory 40 and a processor 42 (which may be the same as memory 32 and processor 34), which may be programmed or configured to facilitate and/or implement the functionality of the wireless module 22 as described or otherwise envisioned herein.

In an embodiment, the distributed controllers 12 may be divided into one or more groups. For example, as shown in FIG. 4, distributed controllers are divided into two groups, in which one set of slave devices 14 is controlled by one group (e.g., Group 1) while the other set of slave devices is controlled by the other group (e.g., Group 2). Stated differently, all distributed controllers of a given group are made responsible for controlling all slave devices 14 in the same group. The groups and corresponding sets of slave devices 14 may be formed during a commission phase or may be configured at a later time by a user.

In addition to receiving inputs from sensor 30, distributed controllers 12 may receive input from other input devices, such as switches 44 for manual override of lighting control and stand-alone sensor 46 (e.g. for improved special coverage of the detection area). Furthermore, the distributed controllers 12 may be connected to gateway 48 (i.e., networked controllers) such as an on-premise building management system or cloud-based services. Such networked controllers may be used for ease of commissioning or for scheduling. Thus, the input for distributed controllers 12 may further be, for example, a time signal from a gateway 48, triggering a scheduled behavior (e.g. switching an entire floor off for the night time), or a demand response signal from gateway 48, requesting reducing energy consumption in a particular room.

The control behavior for a single distributed controller is further explained by the flowchart of method 50 shown in FIG. 4. For the purposes of FIGS. 4-8B, the activity of one controller 12 amongst the distributed controllers 12 will be described. Even though the activity is described in connection with a single controller 12, the activity and programming of each controller 12 is the same or substantially the same, and thus could be implemented by any of the controllers 12. However, to avoid ambiguity, the controller in focus in FIGS. 4-8B will be denoted by $DC_i$ while the other distributed controllers will be denoted by $DC_{j\neq i}$.

In FIG. 4, at step 52, the controller 12 ($DC_i$) may begin in a reset state, which functions to clear any configuration data and/or pending actions in order to place the controllers in a predetermined idle state. In an alternate embodiment, step 52 may be skipped if there is no requirement to clear configuration data or pending actions in order to enter the idle period at step 54.

At step 54, controller 12 ($DC_i$) enters an idle wait period until it receives an input. After an input (Event:Input) is received—such as an input from sensor 30 (or stand-alone sensor 46), wall switch 44, or a pre-programmed event—the controller 12 ($DC_i$) activates a command timer. In an embodiment, controller 12 ($DC_i$), in response to the input, may also send a message (such as Send MotionDetectedMessage described in connection with FIG. 6A) to the other distributed controllers 12 ($DC_{j\neq i}$) notifying them of the input. This may be particularly important if the other distributed controllers did not receive independent notification of the input, which may occur, for example, if the controller 12 received from the signal from an integrated sensor 30. The MotionDetectedMessage message may be sent for various reasons, for example: to align the status of the actuators connected to the distributed controllers (e.g. to ensure the lamps controlled directly by the distributed controllers turn on), to increase the number of distributed controllers that can deliver the message to the slave devices (e.g. if the distributed controllers are not themselves controlled by the input), and/or to align the state of the different distributed controllers. The input, therefore, from the perspective of the other distributed controllers ($DC_{j\neq i}$), may be a signal from distributed controller 12 ($DC_i$).

The command timer represents a wait period 58 unique with respect to the other distributed controllers 12 ($DC_i$). If the timer expires (Event:Command_TimerTrigger), the controller 12 ($DC_i$) will notify, at step 60, the other distributed controllers ($DC_{j\neq i}$) of its intent to send a command. In response, the other distributed controllers 12 ($DC_{j\neq i}$) will not send a notification or command (i.e., the other distributed controllers will cancel the command—as used herein, cancelling the command does not necessarily imply that the operation of sending the command was yet in progress). After controller 12 ($DC_i$) sends the notification, it sends the command to slave device 14 at step 62. If, before the command timer expires, controller 12 receives a notification from one of the other distributed controllers 12 ($DC_{j\neq i}$) (Event:NotificationFromOtherController) the controller ($DC_i$) will cancel the notification and command. The controller 12 ($DC_i$) may further deactivate the command timer at step 64. After either deactivating the command timer or sending the command, the controller 12 ($DC_i$) will either enter the reset or idle wait state to await another event. It would be understood by those skilled in the art that method 50 is defined with respect to the task of controlling the slave device; the distributed controller may also perform other tasks in any of the states of that flow, including the idle state, e.g. send and receive other data (e.g. commands required to keep the network operational), perform calculations, etc.

As described above, each distributed controller 12 will implement a timer having a length that is relatively unique with respect to the remaining distributed controllers. This may be accomplished, for example, by each distributed controller 12 implementing a timer having a random length within a range of possible lengths (e.g., having a minimum and maximum possible value). It will be understood that the random length, as used in herein, may be generated by an algorithm configured to generate a pseudorandom value. It should be understood that, depending on the size of the set of values to randomly choose (accepting forwarding delay), and the number of distributed controllers generating the random number at any given moment, there is a certain probability that two or more distributed controllers 12 will generate the same length for the timer and/or will send the notification message (or other message, depending on the timer/embodiment) at the same time. Nevertheless, because timers based on a random number generator will produce unique timer lengths in many instances, it should be understood that random timers are considered a method of generating unique timer lengths amongst the distributed controllers 12.

Because each distributed controller 12 is implementing its own timer having a random length, no two controllers will likely have the same length. Alternately, the distributed controllers may each implement timers having a predefined length, such that the distributed controllers 12 send commands in a predefined order with respect to each other. This order may be determined during a configuration period and may be set automatically or by a user. In yet another embodiment, the timer can be derived from the received trigger, e.g., the RSSI of the frame received from the standalone sensor. In another example, any other value from the triggering signal may be used, such as the sequence number of the frame received from the standalone sensor or the handle of the signal received from the integrated sensor. In another example, the unique timer can be generated by combining the received value with the distributed controller's own sequence number. One of ordinary skill in the art will appreciate that, while it may be necessary for each distributed controller 12 to implement a timer that is unique to the remaining distributed controllers, the way that the timer is uniquely set may be accomplished in a variety of ways.

Figure 5:
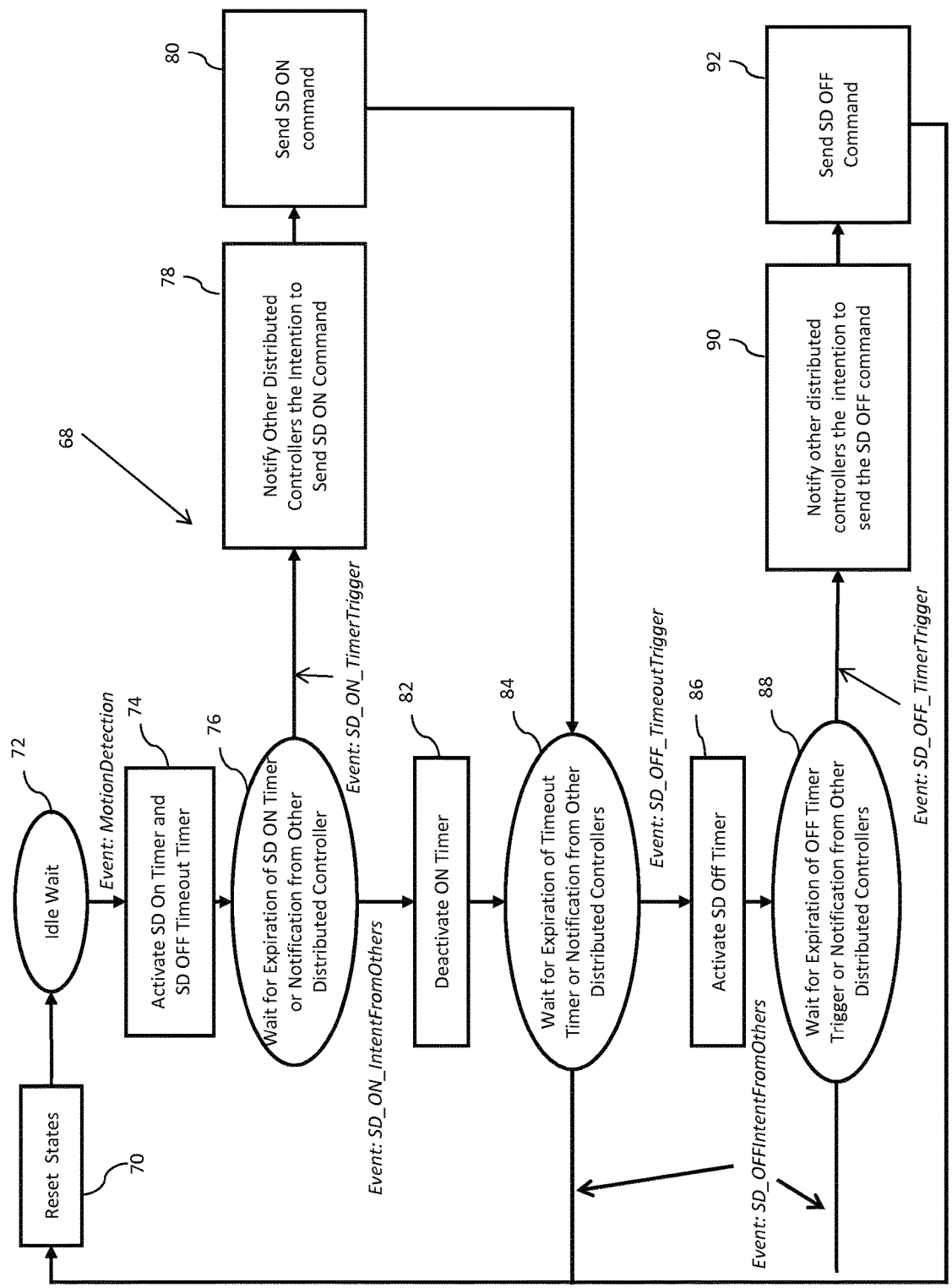
FIG. 5 is a flowchart of a method implemented by a distributed controller in accordance with an embodiment.

FIG. 5 depicts a flowchart of method 70 of the steps implemented by a controller configured to control, for example, a plug load controller or a lighting device in conjunction with a motion detector that determines when a plug load controller should be activated. It should be understood that the same series of steps could apply to any other device that should be activated in response to a sensor, switch, or other input and deactivated after a period without input.

Like method 50, at step 70, the controller 12 ($DC_i$) begins in a reset state (or, in another embodiment, directly in the idle wait period), after which, at step 72, the device enters an idle wait period until it receives an input. At step 74, after receiving a motion detection input from a motion sensor (Event:MotionDetection) a set of timers are activated, which include at least an SD ON Timer and an SD OFF Timeout Timer. The SD ON Timer, like the timer described in connection with FIG. 5, is a timer having a length unique with respect to the SD ON Timers of the remaining distributed controllers 12 ($DC_{j\neq i}$).

At step 76, controller 12 ($DC_i$) waits for the expiration of the SD ON Timer or a notification from one of the other distributed controllers 12 ($DC_{j\neq i}$). If the SD ON Timer expires (Event:SD_ON_TimerTrigger), in step 78, controller 12 ($DC_i$) notifies the other distributed controllers 12 ($DC_{j\neq i}$) of its intent to send an SD ON command to the slave device 14, after which, at step 80, the controller 12 sends the SD ON command. The other distributed controllers 12, ($DC_{j\neq i}$) will cancel sending an SD ON command to the slave device 14 as a result of receiving the notification. If a notification (Event: SD_ON_IntentFromOthers) is received from another distributed controller 12 ($DC_{j\neq i}$) before the expiration of the SD ON Timer, the controller 12 ($DC_i$) may de-activate the SD ON Timer and thus cancel sending the SD ON command to the slave device.

In either case, once an SD ON command is sent to the slave device (either by the controller 12 ($DC_i$) or by another controller 12 ($DC_{j\neq i}$)), the controller 12 ($DC_i$) will wait for the expiration of the SD OFF Timeout Timer at step 84 (representing a predetermined time in which a motion detection signal is not received, suggesting that the predefined area is now vacant) or for a notification from another controller 12 ($DC_{j\neq i}$) that the slave device 14 has or will be deactivated by the other controller ($DC_{j\neq i}$). In an embodiment, the length of the SD OFF Timeout Timer is the same for all distributed controllers—and all slave devices.

If the controller 12 ($DC_i$) receives a presence indication while the SD OFF Timeout Timer is running—the presence indication, e.g., coming from a sensor, integrated 30 or stand-alone 36, or from another distributed controller 12 ($DC_{j\neq i}$) in the same network or area—the controller 12 ($DC_i$) restarts the SD OFF Timeout Timer. Furthermore, in an embodiment, distributed controller 12 may start the SD ON Timer to send another SD ON command to the slave device.

In another embodiment, the length of the SD OFF Timeout and/or the SD ON Timer and SD OFF Timer may differ between distributed controllers, e.g. depending on the type of the zone they control, the number of distributed controllers in that zone, the typical movement/presence pattern in that zone, etc.

As mentioned above, in an embodiment, each slave device 14 may initiate its own SD OFF Timeout timer. In an embodiment, the length of the SD OFF Timeout may differ between slave devices 14. The length of the SD OFF Timeout Timer may, for example, be dependent on the type of the slave device 14. For example, the length of SD OFF Timeout Timer may be different for legacy lamps and plugs, with the lamps being turned on longer, to allow the user to exit the area safely, while the plugs (e.g., when supplying power to computer screens) are switched off more quickly. Alternately, the lamps may switch off quickly, while the plugs (e.g. when supplying power to beamers), stay on longer to allow the lamp to cool down. Further, the length of SD OFF Timeout Timer may be dependent on the relative position of the switch/sensor, controller 12 and slave devices 14. For example, if the sensor is at the main floor entrance, the plugs controlling the task lights at the end of the floor may be turned on with a higher delay (when a person may be expected to get to that area). In still another embodiment, multiple values of a particular timer may be used in the same zone.

If the SD OFF Timeout Timer expires (Event:SD_OFF_TimeoutTrigger), the controller 12 ($DC_i$) activates SD OFF Timer at step 86, a timer having a unique length with respect to the other distributed controllers ($DC_{j\neq i}$) that determines which controller will send an SD OFF command to the slave device. If, however, a notification is received from another controller 12 ($DC_{j\neq i}$) that the slave device has or will be deactivated by the other controller ($DC_{j\neq i}$), controller 12 ($DC_i$) will not send the SD OFF command and will begin again at the reset or idle state.

Controller 12 ($DC_i$) waits at step 88 for the expiration of the SD OFF Timer. If the SD OFF Timer expires (Event: SD_OFFTimerTrigger), then at step 90 the controller 12 ($DC_i$) will notify the other distributed controllers 12 ($DC_{j\neq i}$) of its intent to send the send the SD OFF command to the slave device 14. At step 92 the controller 12 ($DC_i$) sends the SD OFF command to the slave device 14. If, however, a notification (Event: SD_OFFIntentFromOthers) is received representing another controller's 12 ($DC_{j\neq i}$) intent to send the SD OFF command, controller 12 ($DC_i$) will not send the SD OFF command and will begin again at the reset or idle state.

Thus, FIG. 5 describes a system that enacts three timers, a first timer to determine which controller 12 will send an ON command to the slave device 14, a timeout timer to determine when a period has elapsed sufficient to determine that a person is no longer in the room, and a final timer to determine which controller will send an OFF command. In another embodiment, only two timers may be used by combining the timeout timer and OFF command timer into a single timer having a length greater than the timeout timer but still unique to each controller 12 in order to prevent controllers sending redundant OFF signals.

Figure 6A:
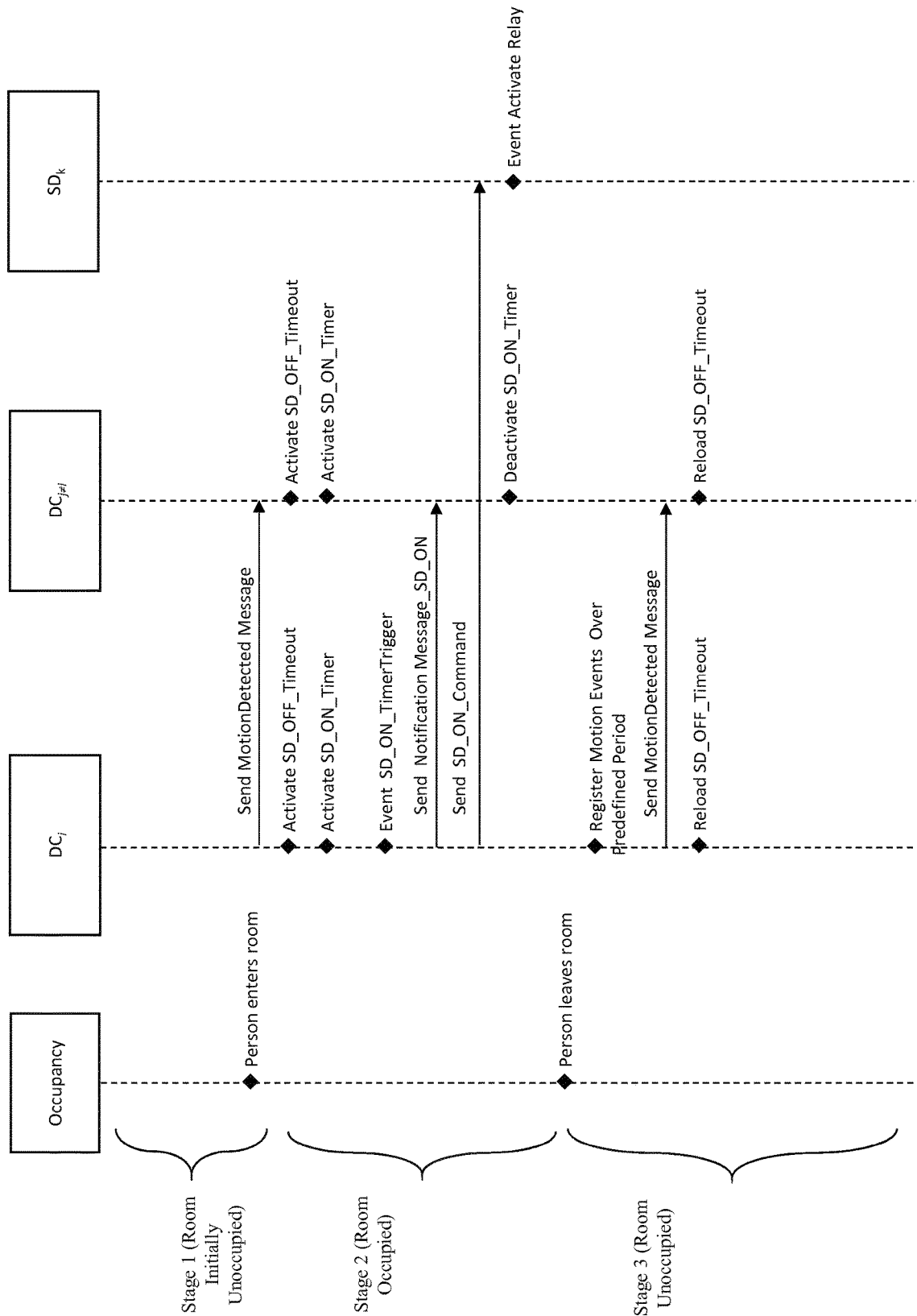
FIG. 6A is a message sequence chart of a distributed control system according to an embodiment.

Turning to FIG. 6A, an example embodiment of the method described in connection with FIG. 5 is shown as a state diagram in order to provide a more global view of the actions taken by each controller 12. At stage 1, motion detected by a certain distributed controller 12 ($DC_i$) (from a person entering a room) is shared with other distributed controllers ($DC_{j\neq i}$) by sending the message (Send Motion- DetectedMessage). At stage 2, the room now being occupied, this message triggers a sequence of actions related to control of slave devices belonging to the same group. All distributed controllers ($DC_{j\neq i}$) that receive this message (i.e. controllers in the same group as $DC_i$), if the status of the distributed controllers and/or the plug loads is OFF, will activate timers that correspond to the intervals needed for switching off the receptacles when in unoccupied state (SD_OFF_Timeout) and random intervals (SD_ON_Timer) for backing off from sending receptacle control command.

In some embodiments, all or some of the distributed controllers 12 may not know the status of the slave devices 14 but may estimate the status of the slave devices 14 according to each distributed controller's 12 status or according to a most-recently recorded status.

The distributed controller (here, $DC_i$) whose back-off timeout triggers first (SD_ON_TimerTrigger) will send a notification to the other distributed controllers 12 ($DC_{j\neq i}$) about the intended state of the receptacle via the message (NotificationMessage). After which, the distributed controller ($DC_i$) sends the receptacle control command (SD_ON_Command) to all receptacles in the group. This back-off behavior helps keep the network overhead of slave device controls low.

In an alternate embodiment, sensor 30 or sensor 46 may supply the trigger for switching the slave device 14 off by reporting an unoccupied state.

At stage 3, when the person leaves the room or another motion event is detected, by another distributed controller in the same group, or by the same controller ($DC_i$) after the default interval is over, the detected motion may be reported to other distributed controllers ($DC_{j\neq i}$) after a predefined event registration interval. With respect to receptacle control, this event results in resetting of the receptacle switch off interval (SD_OFF_Timeout). No additional commands need to be sent as the receptacles state (ON) is known by all distributed controllers. This helps to further keep network usage low.

Figure 6B:
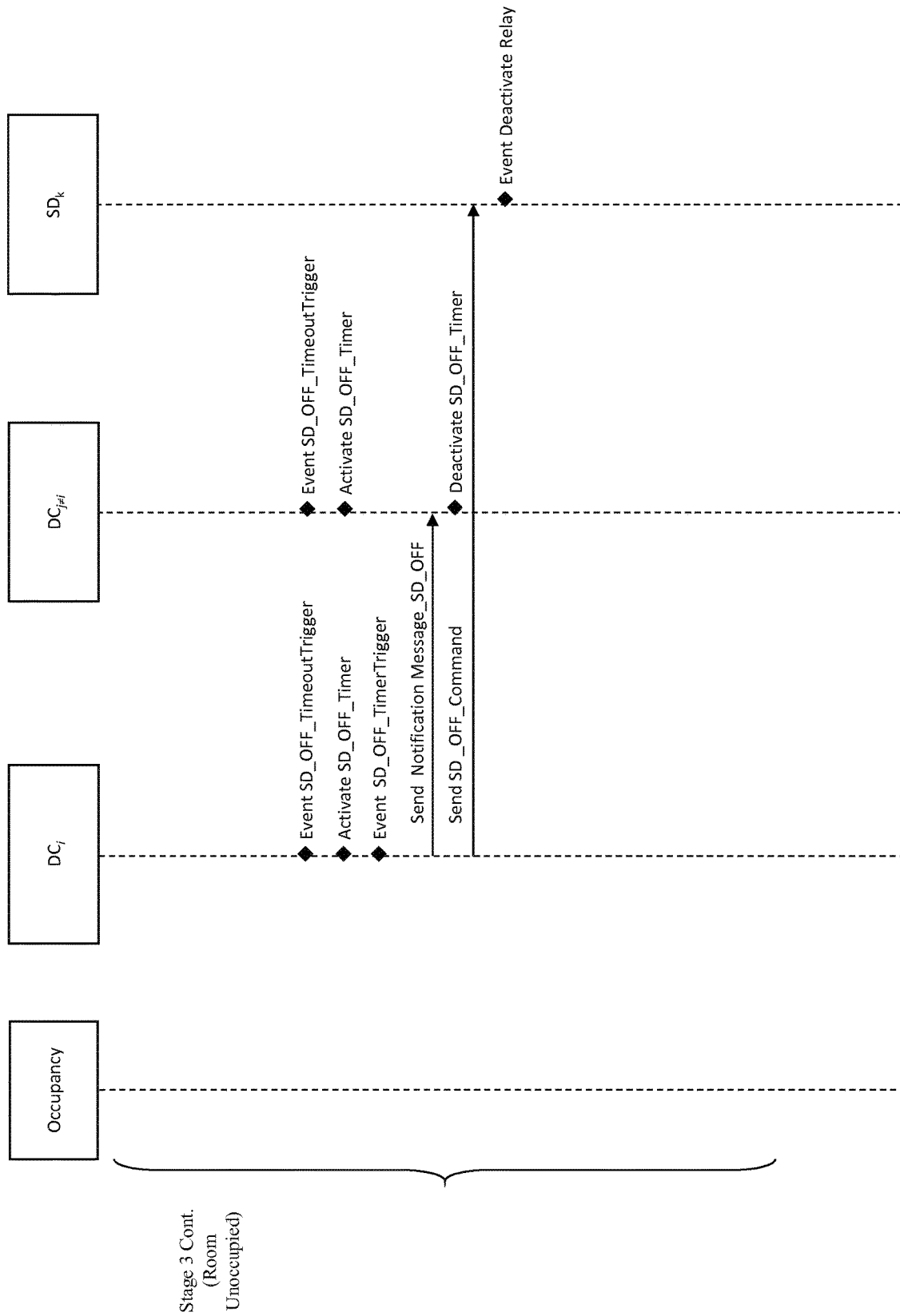
FIG. 6B is a message sequence chart of a distributed control system according to an embodiment.

FIG. 6B is a continuation of state diagram of FIG. 6A and shows the sequence of events when the room is eventually identified as empty by the distributed controllers 12. After the SD OFF Timeout Timer expires (SD_OFF_TimeoutTrigger), every distributed controller activates a unique back-off timer (SD_OFF_Timer) to be sure it is the one that needs to command the slave device to go OFF. Eventually, one of the distributed controllers 12 (here, $DC_i$) will detect the expiration of the back-off timer (SD_OFF_TimerTrigger) and send the notification message (NotificationMessage_SD_OFF) to the other distributed controllers ($DC_{j\neq i}$). Upon receiving this message, the other distributed controllers ($DC_{j\neq i}$) deactivate their back-off timers. After sending the notification message, the controller 12 ($DC_i$) sends the SD OFF Command, causing the slave devices to deactivate.

Note that the distributed controller that sends the SD OFF command is not necessarily the one who activated the slave device 14—that may be accomplished by any other distributed controller 12.

In the above embodiments, the slave devices are controlled, and the other distributed controllers are informed about it, using separate commands. Separate commands may be used for variety of reasons, including: (1) different command sets supported by both device types, precluding usage of one and the same command; (2) the same command(s) are supported by both device types, but different intended application behavior of both device types upon occupancy detection; (3) if the command to be used for slave device is also supported by the distributed light controllers, then in each group the two devices types may need to be separated by using a sub-group, to allow for communication targeting just one device type.

Furthermore, in another embodiment, additional information may be included in the notification messages or in the commands, e.g. additional timing related information, level, reset information, etc.

In another embodiment, a confirmation message is sent from the controller 12 that sent the command to the remaining distributed controllers 12 in order to confirm that a state-change command was sent to the slave device 14. In an embodiment, the confirmation message may be sent instead of or in addition to message notifying the other distributed controllers of the controller's intent to send the state-change command. In another embodiment, command and the confirmation message may be sent by different entities, e.g. the distributed controller 12 can send the control command to the slave devices 14, and the slave devices 14 can inform the other controllers about their state change, e.g. using state reporting. In extension, the distributed controllers 12 only stop their timer and cancel their scheduled transmission of the state-change command, if they receive the confirmation command. Until no confirmation is received, multiple distributed controllers can send the state-change command at their respective timeout, to increase the probability that the slave devices will receive the state-change command.

In another embodiment, one and the same message is used to communicate with both types of devices; resulting in even further reduced traffic (e.g., the notification signal and/or the confirmation signal is/are combined with the command signal).

Figure 7A:
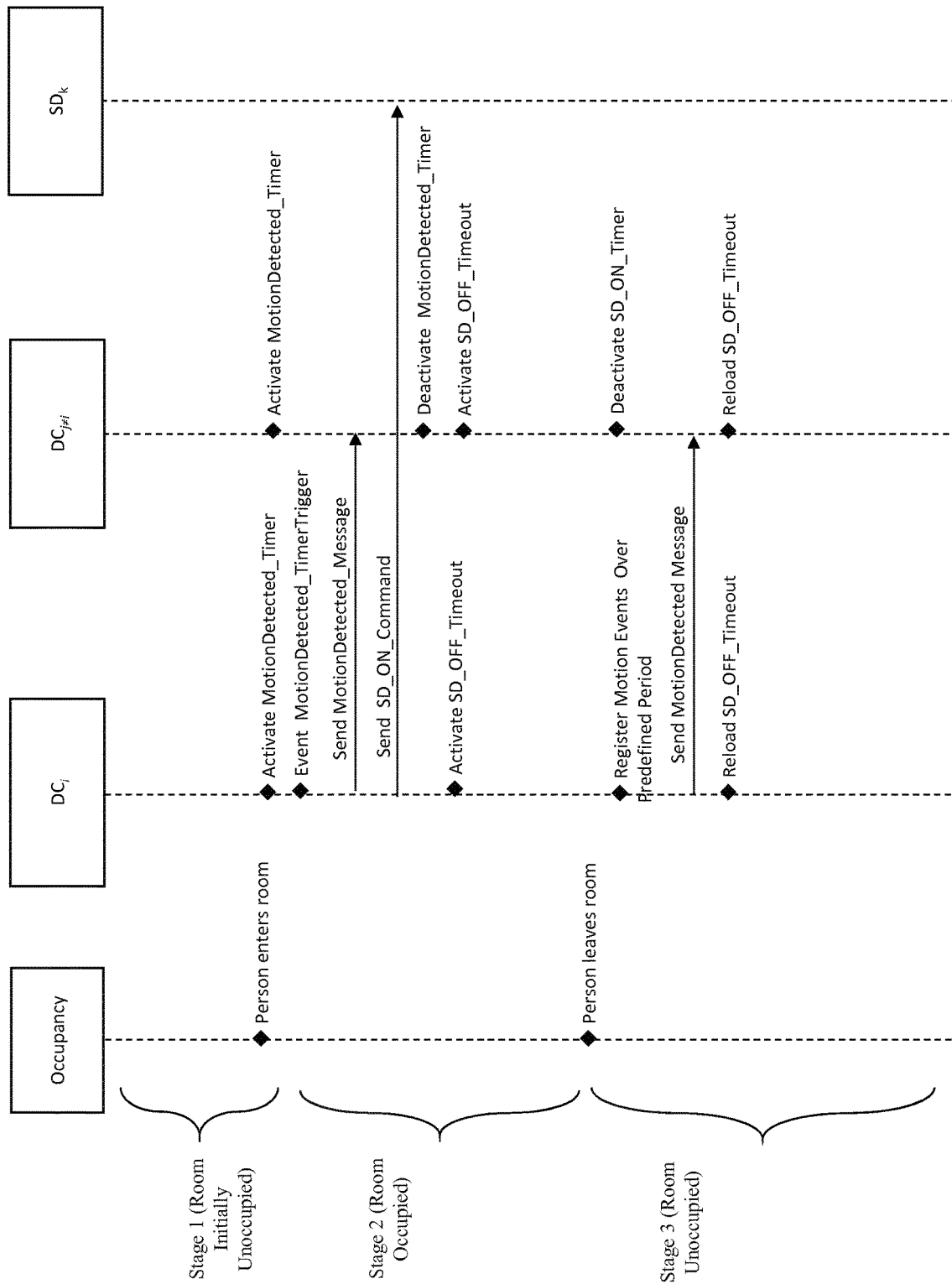
FIG. 7A is a message sequence chart of a distributed control system according to an embodiment.
Figure 7B:
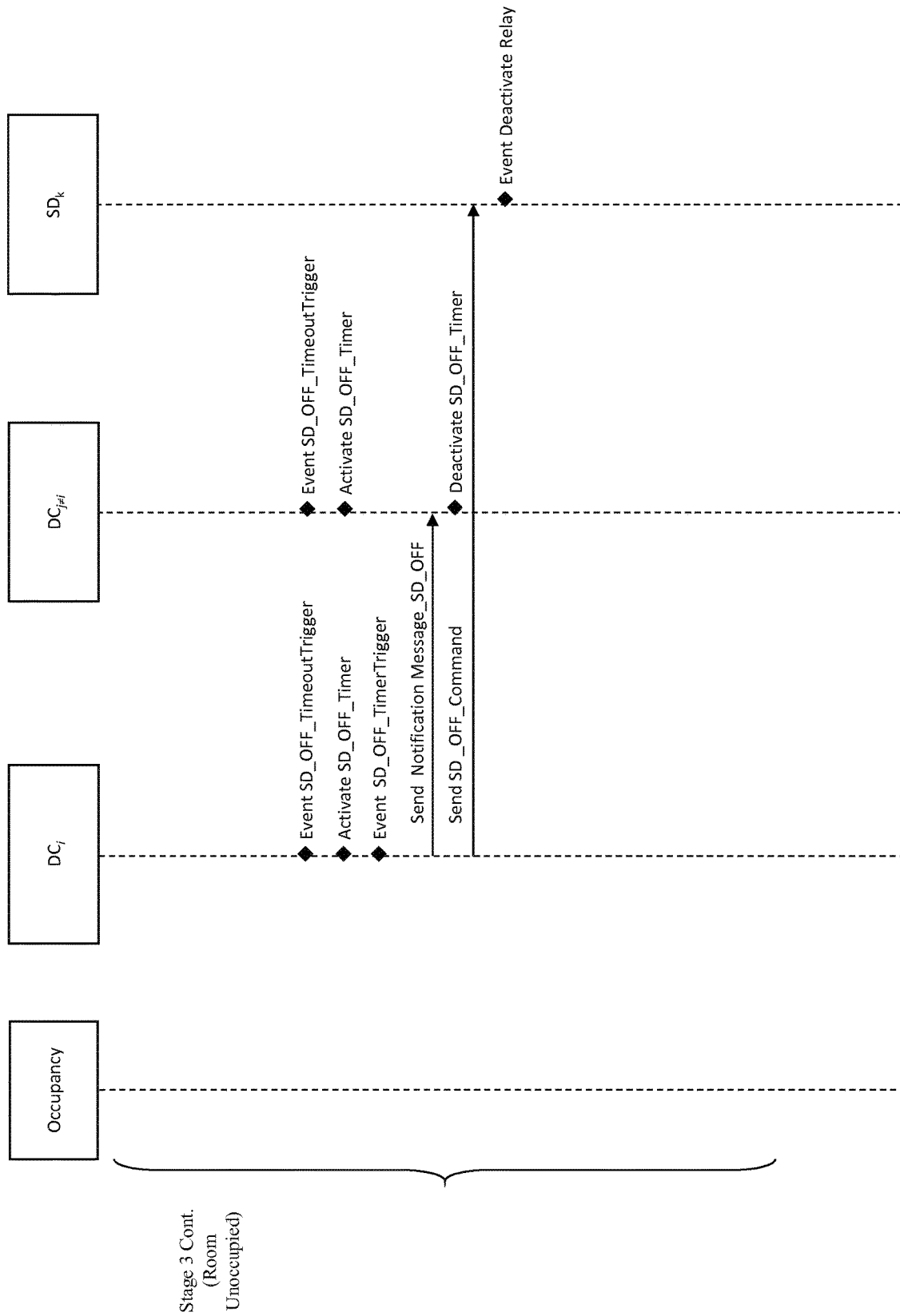
FIG. 7B is a message sequence chart of a distributed control system according to an embodiment.

As shown in FIGS. 7A-7B, in an alternate embodiment, the Motion Detected Message may also serve as the role of the notification message for the other distributed controllers 12 ($DC_{j\neq i}$). In such a case, the motion detected message may be sent after a unique back-off period if other distributed controllers 12 ($DC_{j\neq i}$) (e.g., in an embodiment, a subset of all distributed controllers 12) have also received an input indicative of motion. As shown, after a person enters the room, controllers 12 activate a back off timer to send the Motion Detected message (Activate Motion Detected_Timer). It should be understood that only some of controllers 12 ($DC_{j\neq i}$) (e.g., those receiving a sensor or other signal) will activate the Motion Detected Timer, while others may remain idle. The first controller 12 (here, $DC_i$) to reach the expiration of the Motion Detected timer (Event Motion-Detected_TimerTrigger) sends the Motion Detected message (Send MotionDetected_Message). As shown, the first controller 12 (here, $DC_i$) to reach the expiration may also send the SD ON Command. (Alternately, as shown in FIG. 6A, after sending/receiving the Motion Detected message, controllers 12 may initiate an SD ON timer to determine which controller sends the on command. In other words, the controller 12 that sends the Motion Detected message is not necessarily the same as the controller 12 that sends the SD ON Command.) Reception of the MotionDetected message by the other distributed controllers 12 ($DC_{j\neq i}$) results in those distributed controllers cancelling any scheduled MotionDetected message (Deactivate Motion Detected_Timer)—this step applies to distributed controllers 12 that had previously received an input indicative of motion. Finally, all distributed controllers 12 in this group (whether or they originally received the signal indicative of the detected motion) initiate the SD OFF Timeout Timer in response to the Motion Detected message (Activate SD_OFF_Timeout). The remaining elements of FIGS. 7A-7B are the same or substantially similar to those described in connection with FIGS. 6A-6B and thus do not require further discussion here.

Figure 8A:
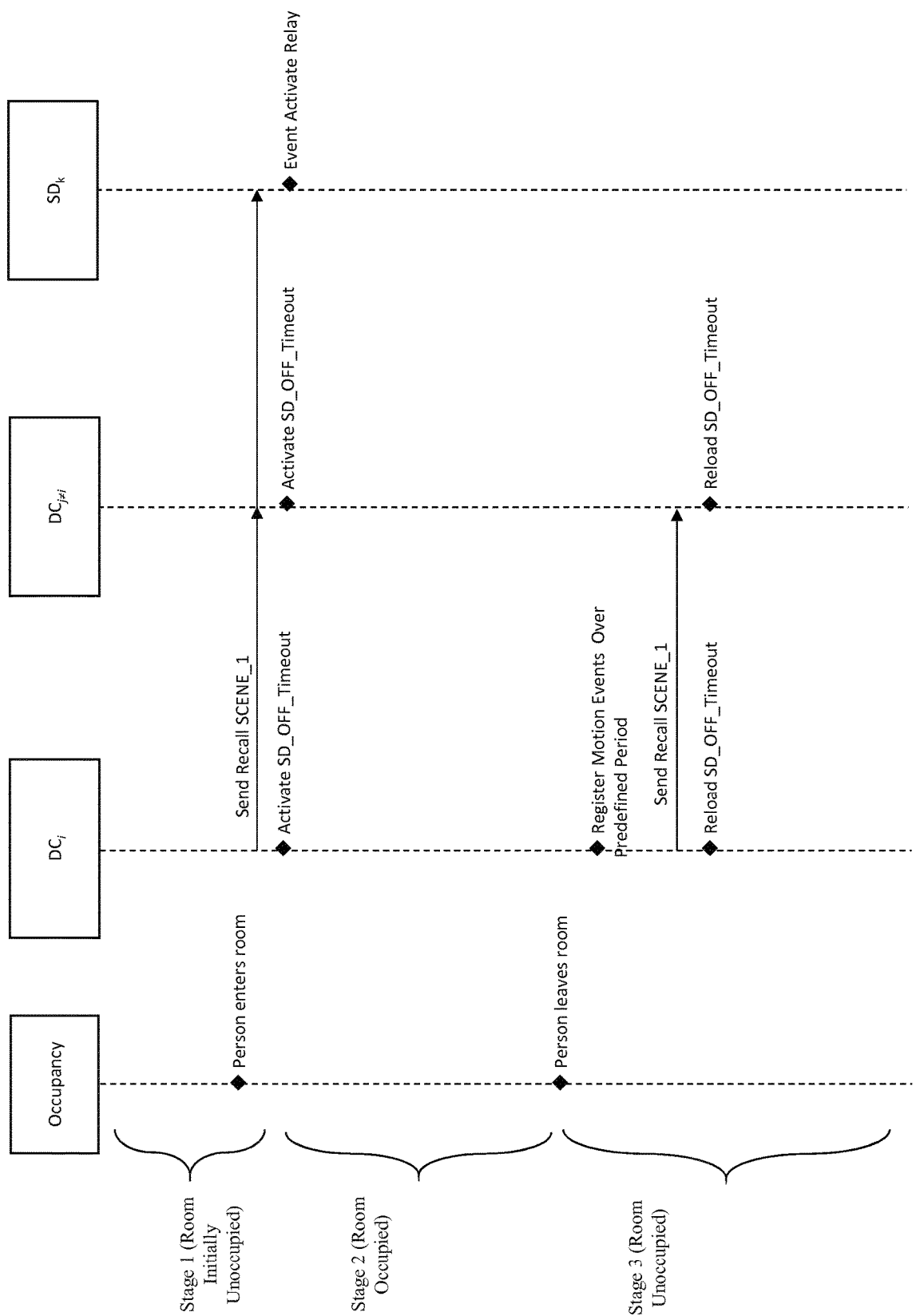
FIG. 8A is a message sequence chart of a distributed control system according to an embodiment.
Figure 8B:
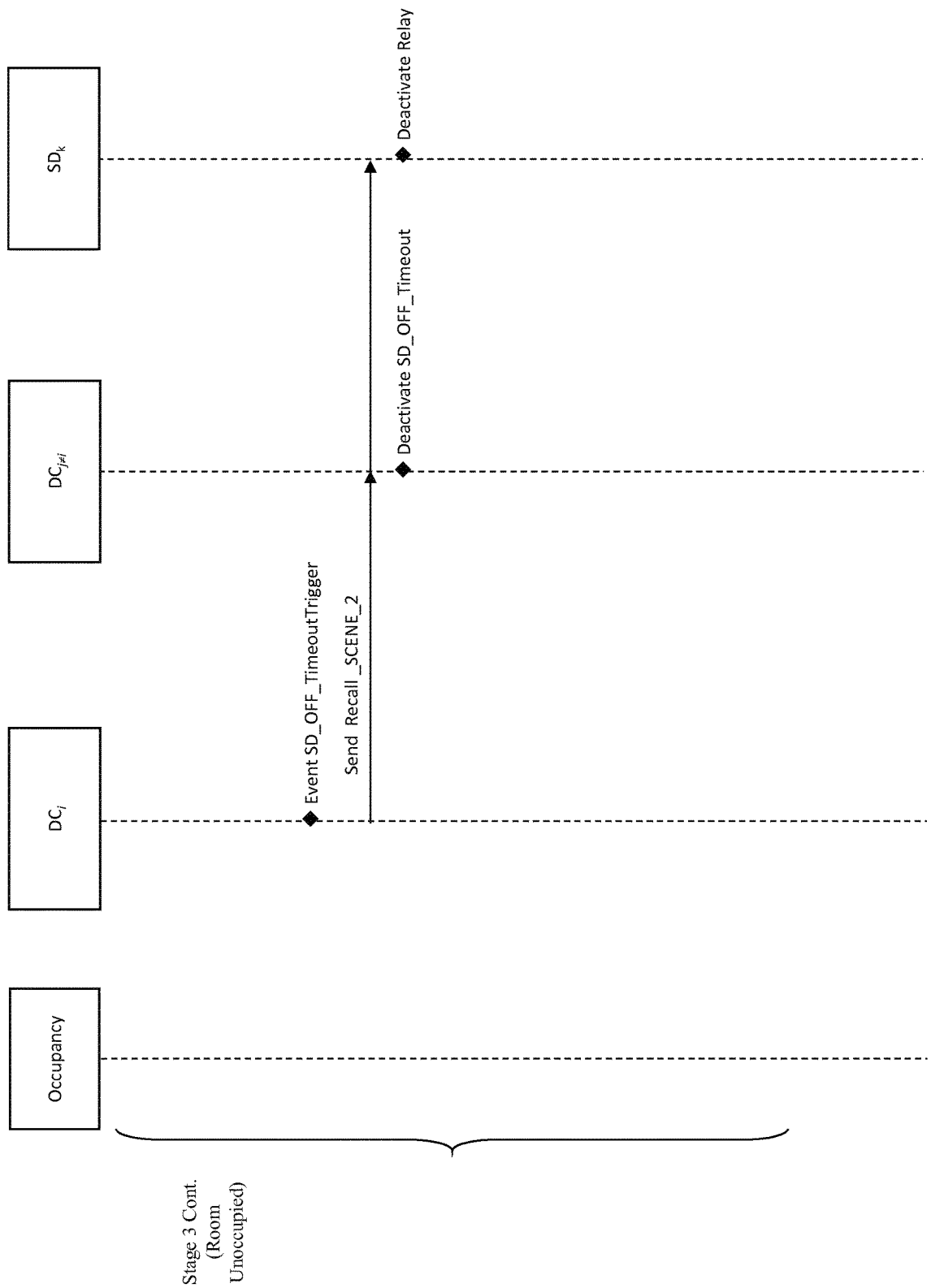
FIG. 8B is a message sequence chart of a distributed control system according to an embodiment.

As shown in FIGS. 8A-8B, slave devices 14 and/or the distributed controllers 12, in an alternate embodiment, may be configured to store recallable configurations (i.e., scenes) that may be recalled with a command from a controller. A preset for a given event may be coordinated, but different, between all slave devices 14 within a group. (For example, under a first preset command corridor and window-side lamps may go into different light levels when occupancy is detected.) Thus, by sending a given command (e.g., Recall_SCENE_1) the controller 12 that detected the motion may let all other distributed controllers 12 and slave devices 14 in the same group know that motion has been detected, and thus let them take appropriate preconfigured actions.

In this case, further reduction of network traffic might be possible as the explicit message and command transmission is not required—only the preset recall command is required. For example, as shown in the state diagram of FIG. 8A, controller 23 ($DC_i$), at the end of stage 1, detects motion and sends a command (Recall_SCENE_1) to both the remaining distributed controllers ($DC_{j \neq i}$) and the slave devices. In response to the (Recall_SCENE_1) command, slave devices 14 take the preconfigured action. In the case of plug load controllers, the preconfigured action may be to activate the plug load controller relay in order to provide power to the socket. The distributed controllers 12 ($DC_{j \neq i}$) activate their SD OFF Timeout Timers (Activate SD_OFF_Timeout). Controller 12 ($DC_i$) also activates its SD OFF Timeout Timer (Activate SD_OFF_Timeout). In an embodiment, as described above, the Scene 1, as stored in slave devices 14, may include setting a SD OFF Timeout Timer, instead of SD OFF Timeout Timer being implemented in distributed controllers 12.

Because the scene recall is a preprogrammed event, the distributed controllers 12 may each also perform preprogrammed additional actions, such as controlling light sources of the luminaires 16 in which they are integrated, in response to the scene recall. The scenes, as stored in the slave devices 14 and distributed controllers 12 may be stored in the memories of the respective devices.

At stage 3, when the person leaves the room or another motion event is detected, by another distributed controller in the same group, or by the same controller ($DC_i$) after the default interval is over, the detected motion may be reported to other distributed controllers ($DC_{j \neq i}$) after a predefined event registration interval. With respect to receptacle control, this event results in sending of the command (Recall_Scene_1) and reloading the SD OFF Timeout Timers (Reload SD_OFF_Timeout). Because the slave device 14 is already in the ON state, no additional action is taken.

As shown in FIG. 8B, a continuation of stage 3 shown in FIG. 8A, when the room is not occupied, at the expiration of the SD OFF Timeout Timer (Recall_SCENE_2) message is sent that leads to de-activation of relays in the slave devices and cancellation of the de-activation command (e.g., by deactivation of timers) in the remaining distributed controllers ($DC_{j \neq i}$). Note that the distributed controller that sends the (Recall_SCENE_2) message is not necessarily the one who activated the plug load controllers, which may be performed by any distributed controller 12.

In one embodiment, no unique waiting timers would be needed as the scene recall command is heard by all members of a group. In another embodiment, (e.g., when there is a higher density of sensors) there is still an initial unique delay for the commands announcing the state change from occupied to unoccupied, to prevent sending multiple groupcast messages triggered by multiple sensors.

While, in the above, group communication using broadcast, multicast or groupcast mechanism is described, one of ordinary skill in the art will appreciate that in alternate embodiments, the same goals can be achieved by sending multiple unicast messages in a quick succession.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. A distributed control system, comprising:
a plurality of controllers, each controller of the plurality of controllers being in communication with the remaining controllers of the plurality of controllers, each controller being configured to control at least one device, each controller being further configured to:
initiate a first timer, in response to a received signal, the first timer having a length that is unique with respect to the first timer lengths of the remaining controllers of the plurality of controllers;
send a first notification signal, upon the expiration of the first timer, to the remaining controllers notifying the remaining controllers of an intent to send a command signal; and
send the command signal to the at least one device, wherein the controller is configured to cancel sending the first notification signal and the command signal if the first notification signal is received from one of the remaining controllers of the plurality of controllers prior to the expiration of the first timer.

2. The distributed control system of claim 1, wherein each controller is further configured to:
initiate a second timer, the second timer having an expiration after the expiration of the first timer, the second timer having a length that is unique with respect to the second timer lengths of the remaining controllers of the plurality of controllers;

send a second notification signal, upon the expiration of the second timer, to the remaining controllers notifying the remaining controllers of an intent to send a second command signal; and send the second command signal to the at least one device, wherein the controller is configured to cancel sending the second notification signal and the second command signal if the second notification signal is received from one of the remaining controllers of the plurality of controllers prior to the expiration of the second timer.

3. The distributed control system of claim 2, wherein each controller is further configured to:

initiate a third timer, wherein the length of the third timer is the same across all remaining controllers and is greater than the length of the first timer; and initiate the second timer in response to the expiration of the third timer.

4. The distributed control system of claim 1, wherein the at least one device is a plug load control device.

5. The distributed control system of claim 4, wherein the first command signal is an ON command configured to cause the plug load control device to cause power to be delivered to a socket.

6. The distributed control system of claim 1, wherein the received signal is a sensor signal.

7. The distributed control system of claim 6, wherein the received signal is only received at a subset of the plurality of controllers, wherein the notification signal further notifies at least one controller of the remaining controllers of detected motion.

8. The distributed control system of claim 6, wherein the sensor signal originates at a sensor coupled to at least one controller of the plurality of controllers.

9. The distributed control system of claim 8, wherein the controller coupled to the sensor is configured to notify the remaining distributed controllers of the sensor signal.

10. The distributed control system of claim 1, wherein the received signal is received from another controller of the plurality of controllers.

11. The distributed control system of claim 2, wherein the second command signal is an OFF command.

12. The distributed control system of claim 1, wherein the length of the first timer is randomly set and has a maximum possible value.

13. The distributed control system of claim 1, wherein each controller includes a respective wireless module through which each controller communicates with the remaining controllers of the plurality of controllers.

14. The distributed control system of claim 1, wherein each controller is further configured to:

initiate a timer, the second timer having a length that is unique with respect to the second timer lengths of the remaining controllers of the plurality of controllers;

send a second command signal to the remaining controllers and to the at least one device, wherein the remaining controllers and the at least one device, in response to the second command signal recall a second prestored setting.

15. A method for use in a distributed control system comprising a plurality of controllers, each controller of the plurality of controllers being in communication with the remaining controllers of the plurality of controllers, each controller being configured to control at least one device, the method comprising each controller:

initiating a first timer, in response to a received signal, the first timer having a length that is unique with respect to the first timer lengths of the remaining controllers of the plurality of controllers;

sending a first notification signal, upon the expiration of the first timer, to the remaining controllers notifying the remaining controllers of an intent to send a command signal; and sending the command signal to the at least one device, wherein the controller is configured to cancel sending the first notification signal and the command signal if the first notification signal is received from one of the remaining controllers of the plurality of controllers prior to the expiration of the first timer.

* * * * *